May 13, 1952 F. GERHARDT 2,596,478
TRUCK AND TRAILER BODY
Filed Aug. 29, 1949 2 SHEETS—SHEET 1

INVENTOR.
FRED GERHARDT
BY *[signature]*
ATTORNEYS

May 13, 1952 F. GERHARDT 2,596,478
TRUCK AND TRAILER BODY
Filed Aug. 29, 1949 2 SHEETS—SHEET 2
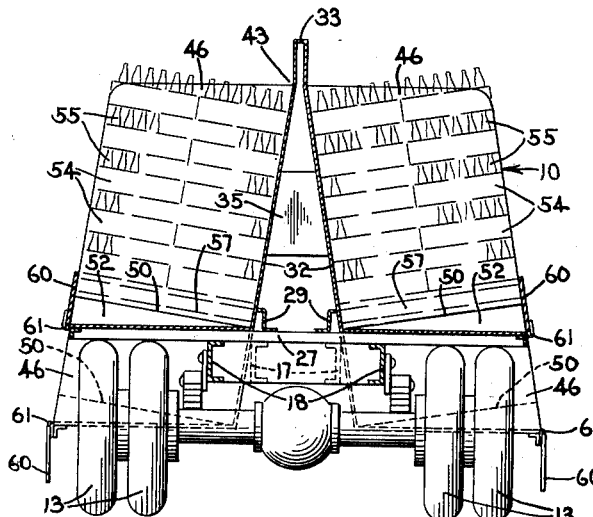
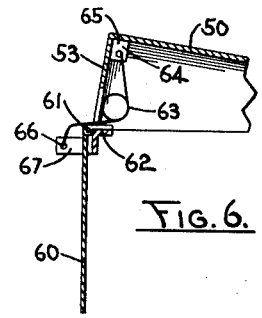
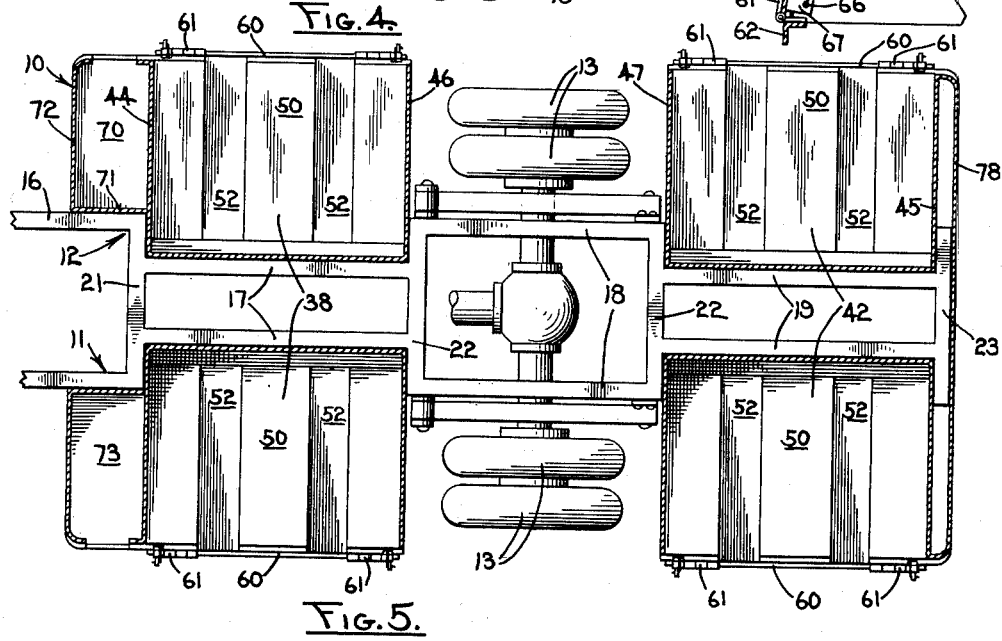
INVENTOR.
FRED GERHARDT
BY
ATTORNEYS Patented May 13, 1952

2,596,478

UNITED STATES PATENT OFFICE 2,596,478

TRUCK AND TRAILER BODY

Fred Gerhardt, Fresno, Calif., assignor of one-half to Bernard Werfel, Fresno, Calif.

Application August 29, 1949, Serial No. 112,990

6 Claims. (Cl. 296—28)

The present invention relates to truck and trailer bodies and more particularly to the load supporting bodies of trucks, trailers, and the like especially suited for use in transporting stacked articles such as cases of bottled beverages and for mechanically loading and unloading the same, as by power operated fork lift trucks.

The transporting of cases of bottled beverages, such as milk, soft drinks, beer, wine and the like by the bottler from the bottling plant to distribution points has always been a time consuming and expensive operation. It has heretofore been the practice to load cases of beverages in stacked relation on flat bed trucks or in truck supported, superimposed, horizontal racks. This has necessitated manual lifting and positioning of a multiplicity of cases and the manual securing of the cases once in position for transportation. The unloading likewise is an extensive manual operation. Such trucks have generally been limited in their capacity for carrying such articles far short of the full weight carrying capacity of the truck, because of the characteristically bulky arrangement of the cases.

Considerable experimentation has been directed to the development of improved means for transporting bottled beverages from the bottling plant to points of distribution. One such device has made provision for hydraulically tipping portions of the truck bed to aid in loading and unloading. Although constituting an improvement over conventional flat bed trucks for the purpose, such trucks having hydraulically tipped beds have required unnecessarily protracted manual effort for loading and unloading operations. Further, the hydraulic mechanisms have been expensive, the pivotal mounting of portions of the bed expensive to produce and subject to frequent structural failures, and the beds seriously limited in their load carrying capacities.

Heretofore, trucks particularly adapted to the transporting of cases of bottled beverages have possessed unnecessarily and objectionably high centers of gravity when loaded. Unless the cases have been tied or otherwise secured in place, they have been easily displaced therefrom and the high center of gravity has made the operation of such trucks difficult and under certain circumstances dangerous.

It has been the conventional practice to stack cases of bottles coming from bottling machines onto pallets and to transport the pallets and their supported cases to truck loading position by means of power operated fork lift trucks. These fork lift trucks are employed to position the pallets adjacent to the transporting truck, from which position they are manually loaded.

It is an object of the present invention to provide an improved load supporting body for trucks, trailers and the like onto which pallet supported articles may be expeditiously loaded and unloaded by fork truck operation and on which such articles are dependably maintained during transportation without the employment of auxiliary retaining means.

Another object is to provide a load supporting body for the aforesaid vehicles having increased effective carrying capacity for bottled beverages and other bulky articles as compared with conventional truck beds of the same area.

Another object is to provide an improved body for trucks and trailers particularly adapted to the transporting of stacked cases of bottled beverages and other bulky articles at a lower center of gravity than has heretofore been known in such vehicles.

Another object is to obviate all manual lifting and positioning of cases of bottled beverages in loading and unloading said cases from transporting means, such as trucks, trailers, wagons and the like.

Another object is to provide a body of the character described adapted to translate gravitational forces and road traversing vibration and jostling into forces imposed upon articles supported by the body to urge the same into body retained position.

Other objects are to provide improved elements and arrangements thereof in a device of the character and for the purposes set forth that are economical to manufacture, dependable in operation, durable in construction, and which eliminate all moving parts.

Still further objects and advantages will become apparent in the subsequent description in the specification.

In the drawings:

Fig. 4 is a vertical, transverse, sectional view through the truck, taken on line 4—4 in Fig. 1.

Fig. 5 is a longitudinal, horizontal, sectional plan view of the body, taken along 5—5 in Fig. 1.

Fig. 6 is a fragmentary, vertical, transverse sectional view through a lateral edge portion of one of the bottle-case-containing compartments showing a toggle mounting of concealing doors optionally provided for the compartments, showing the door in open position as when the truck body is being loaded or unloaded.

Fig. 7 is a view similar to Fig. 6 but showing the door in closed position, as maintained by its toggle operating spring.

Figure 1:
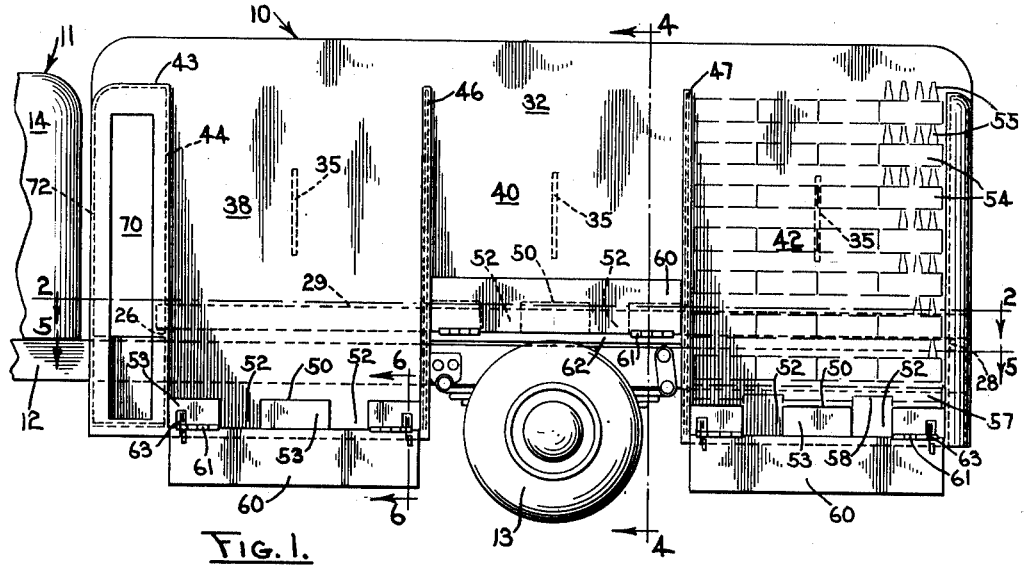
Fig. 1 is a fragmentary side elevational view of a truck body embodying the principles of the present invention.

Referring in greater detail to the drawings:

The suport body of the present invention, indicated generally by the reference numeral 10, is illustrated in the drawings as mounted on a truck 11 for earth-traversing movement having a specially constructed frame 12. It is to be understood that the support body may be suitably employed on a trailer, wagon, or other vehicle without departing from the spirit or the scope of the present invention. For purposes of descriptive convenience the truck 11 is shown as employing a cab, fragmentarily illustrated at 14. The frame is supported at its forward end for earth traversing movement on front wheels, not shown, and at its rearward end by the rear wheels 13.

When the support body 10 is employed on a truck, the frame 12 is of a modified form believed unique in truck frames. As shown in Fig. 5, the frame 12 is conveniently formed of channel iron, as is the conventional practice, or other material of sufficient rigidity and strength. The frame 12 has a forward portion 16 in supporting relation to the cab 14 and the engine of the truck, not shown, a narrowed portion 17 rearwardly adjacent to the forward portion, a portion 18 symmetrically located relative to the rear wheels 13, and a rearward narrowed portion 19. The portions are arranged in concentric alignment relative to the longitudinal axis of the truck. The forward portion 16 and the portion 18 are conveniently of the same width and may readily be of the usual width for the members of truck frames. The narrowed portions 17 and 19 are preferably of the same width and substantially narrower than the portions 16 and 18. By way of illustration and not of limitation, the portions 16 and 18 may be approximately 34 inches in width, as many conventional truck frames are, and the narrowed portions approximately 18 inches in width and achieve the results desired. Other dimensions and ratios may be employed, but these exemplify satisfactory embodiments.

Each of the portions 16, 17, 18, and 19 are formed from substantially parallel channel iron members interconnected at their ends. The rearward ends of the channel iron members of portion 16 and the forward ends of the members of portion 17 are interconnected by a transverse strut 21 of channel iron or other suitable material. Similarly, a pair of central transverse struts 22 interconnect the rearward ends of the members of the portion 17 and the forward ends of the members of the portion 18 as well as the rearward ends of the members of portion 18 with the forward ends of the members of the portion 19. A rearward transverse strut 23, conveniently of a length substantially equal to the struts 22, interconnects the rearward ends of the members of the portion 19. The resulting truck frame possesses the desired strength and rigidity characteristic of truck frames and provides the narrow portions 17 and 19 for purposes subsequently described.

Figure 2:
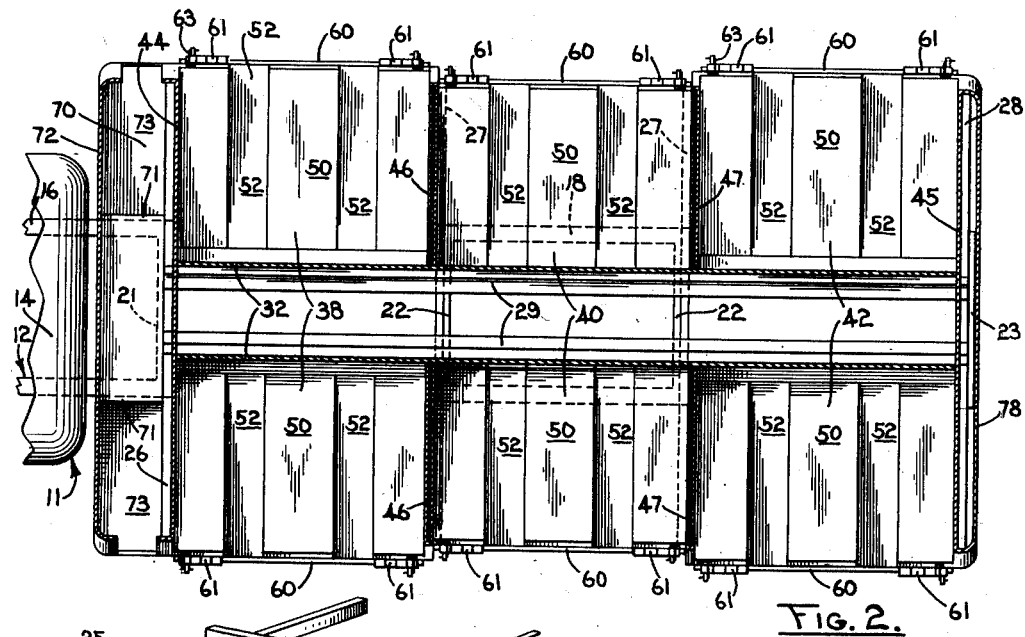
Fig. 2 is a horizontal, longitudinal, fragmentary sectional view through the truck body, taken along line 2—2 in Fig. 1.
Figure 3:
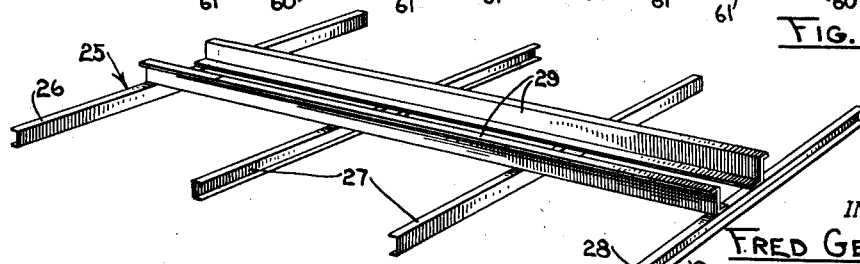
Fig. 3 is a perspective view of a support structure employed in the body of the present invention.

The support body 10 employs a secondary frame 25, of the form illustrated in Figs. 2 and 3, rested upon and secured to the truck frame 12. The secondary frame includes a forward, horizontal, transverse channel member 26, a pair of horizontal, central, transverse, parallel channel members 27, and a rear, horizontal, transverse channel member 28. The channel members 26, 27, and 28 are secured together in horizontal transverse parallelism, as by welding a pair of elongated Z structural members 29 in longitudinal spaced parallel relation across the upper edges of said channel members. This secondary frame 25 is rested upon and secured by any convenient means on the upper side of the truck frame 12 with the channel member 26 located on the forward transverse truck frame member 21, the central channel members 27 located on the central transverse truck frame members 22, and the rear transverse channel member 28 located on the rear transverse truck frame member 23. The secondary frame 25 is thus fixedly positioned with the Z structural members 29 located longitudinally of the truck frame 12 and transversely centered thereon.

A central wall is provided longitudinally of the truck by a pair of panels 32, of sheet steel or the like, each secured to a Z member 29 and upwardly extended therefrom in converging relation to a juncture as at 33. As evident in Figs. 2, 4, and 5, the lower margin of the panels over the portion 18 in the frame terminates flush with the upper edges of the central transverse channel members 27. The lower margins of the panels 32 are extended at the portions 17 and 19 between, and an appreciable distance below, the respective transverse channel members 26 and 27, and 27 and 28. The narrow portions of the frame 17 and 19 accommodate the downward extensions of the panels to aligned, substantially horizontal, lower edges at approximately the axial height of the rear wheels 13. The panels 32 bear an appreciable amount of weight during operation and thus are appropriately reinforced by strut plates 35 interconnecting the panels in fixed spaced relation, as shown in Fig. 4. The panels are conveniently joined at 33, secured to the Z members 29, and mount the strut plates 35, as by welding.

Each of the panels 32 provides an inner wall for a forward load containing compartment 38 at each side of the truck body, as illustrated in Figs. 1 and 5 of the drawing. Each of the forward compartments 38 is substantially longitudinally coextensive with the narrowed portion 17 of the frame. Each panel 32 also provides an inner wall for a central load containing compartment 40 on each side of the truck longitudinally coextensive with the portion 18 of the frame and an inner wall for a rearward load containing compartment 42 at each side of the truck coextensive with the rearward narrowed portion 19 of the truck frame.

As previously mentioned and as shown in Fig. 4, the panels 32 upwardly converge for the reception of loads thereagainst. The panels converge upwardly to the height of the estimated loads. For descriptive convenience this height is illustrated generally at 43. The inward slant for convergence of the panels 32 is not critical but by way of example, when the panels are spaced apart at the Z members 29 approximately 18 inches, it is suitable for them to converge upwardly to a height of approximately four feet above the transverse channel members 26, 27 and 28, at 43, where they are preferably closely spaced and thence upwardly extended for a short distance in parallel relation for purposes of appearance and strength and thence are broken inwardly to their juncture at 33. The panels are provided with erect forward edges rearwardly adjacent to the forward transverse fame member 21 to the anticipated load height shown at 43. The rearward edges of the panels from their lower limit to the anticipated load height 43 are terminated forwardly adjacent to the rearward transverse frame member 23.

A forward transverse panel 44 having a substantially horizontal upper edge portion at the anticipated load height 43, downwardly diverging side edges in substantially parallel relation to the downwardly divergent panels 32 respectively, and a substantially horizontal lower edge portion continuous with the lowermost edges of the panels 32, is mounted transversely of the truck and secured in abutting relation to the forward ends of the panels 32 below the anticipated load height 43. The panel 44 is notched to fit over the frame portion 17 and to fit downwardly along the downwardly extended portions of the panels 32. The peripheral form of the panel 44 is shown in solid and dotted line in Fig. 4. A substantially similarly shaped rearward transverse panel 45 is arranged in abutting relation against the rearward end edges of the panels 32 and fitted downwardly over the narrowed portion 19 of the frame forwardly adjacent to the rearward transverse strut 23. The forward transverse panel 44 provides a forward wall for the compartments 38 and the rearward transverse panel 45 provides a rearward wall for the compartments 42. Intermediate laterally extended partitions 46 and 47 provide both rear walls for the forward compartments 38 and forward walls for the central compartments 40, and rearward walls for the central compartments 40 and forward walls for the rearward compartment 42, respectively. The upper edges of the panels 44 and 45 and partitions 46 and 47 terminate in a common substantially horizontal plane continuous with the anticipated load height 43. The lower edges of said panels and partitions terminate in a substantially horizontal plane common with the lowermost edges of the panels 32 of the longitudinal central wall. The lateral edges of said panels and partitions terminate in common upwardly convergent planes.

Each of the compartments 38, 40 and 42 is provided with an upwardly and outwardly extended floor 50 of sheet metal or other suitable material substantially normal to the upwardly convergent panels 32 providing inwardly sloped resting surfaces for loads. The floors of the compartments 38 and 42 are conveniently welded to the lower margin of the longitudinal panels 32 and the lower edges of their respective panels 44 and 45 and partitions 46 and 47. The floors of the central compartment 40 are welded to the lower margin of the panels 32 which are terminated at approximately the upper edge of the transverse channel members 27 and welded in abutting relation to the partitions 46 and 47. The floor of each of the compartments is formed with a pair of spaced channel portions 52 of substantially rectangular cross section transversely of the truck. The bottoms of the channels at their inner ends are substantially flush with their respective floors 50 and extend outwardly therefrom in substantial conformance to the plane of the lower edges of the transverse panels 44 and 45 and partitions 46 and 47. Thus, the bottoms of the transversely rectangular channels 52 are substantially horizontal while their respective floors 50 are outwardly inclined. The laterally extended edges of the floors 50 and the channel portions 52 are terminated in the planes of the laterally extended edges of the transverse panels 44 and 45 and the partitions 46 and 47. To strengthen the floors 50 and to impart a more finished appearance to the lateral edges of the floors and channel portions, face plates 53 are downwardly extended from the floors to the lower margins of the channel portions and extend between the channel portions, between the channel portions and the transverse panels 44 and 46, and between the channel portions and the partitions 46 and 47 respectively.

Each compartment is adapted to contain a plurality of stacked cases 54 of bottled beverages 55 or other articles to be transported. The bottle beverages 55 are normally arranged in the cases by a bottling machine and the cases stacked on a pallet, indicated generally at 57 in Figs. 1 and 4. The pallets may be of any suitable construction and are well known in the art. The pallets are either notched, as at 58, or otherwise constructed so that the pair of forwardly extending forks employed on power operated fork trucks may slide under the pallets when they are rested upon the floor for elevation of the pallets preliminary to their transportation. The longitudinal wedge-shaped channel portions 52 provide for the reception of the forks so that the pallets may be deposited directly upon the floors 50 of the compartments and thus all manual loading be eliminated. The pallets have cases of bottled beverages stacked thereon and are elevated by the fork truck, not shown, and conveyed directly to the transporting truck where the pallets and the supporting cases of bottled beverages or other articles are positioned directly upon the floors 50, the forks of the fork truck subsequently being lowered and withdrawn from the channel portions 52. It will be observed that as the pallets are deposited on the floors 50 they are tipped inwardly into the attitude shown in Fig. 4 so that the stacks of cases are leaned against the panels 32 of the longitudinal central wall of the truck body of the present invention.

Means is provided for concealing the face plate 53 and the outer ends of the fork receiving channels 52 and for concealing the pallet when positioned on the floor member of a compartment. This concealing means is in the form of a door 60 hinged at 61 to an angle member 62 secured to and extending longitudinally of the truck body along the lower outer edge of each compartment. The door is pivotal to a position concealing the face plate 53, the fork receiving channels 52 and the pallets 57 and is also movable outwardly and downwardly to a depending open position so that the outer open portions of the channels 52 are exposed for entry of the forks of a fork truck for loading or unloading purposes. The doors 60 are yieldably held selectively in closed or in open position by providing toggle springs 63 for each door, which are in the form of helical torsion springs having ends connected at 64 to brackets 65 secured as by welding into the corners formed by the junctures of the floors 50 and their adjacent face plates 53. The toggle springs are connected at their opposite ends, at 66, to brackets 67 secured by welding to the inner faces of each door and extended inwardly therefrom. The connection 66 of each spring to its respective door is located relatively to its other connection 64 and the hinge 61 of the door so that a toggle effect is obtained with the connection 66 moving to opposite sides of dead center or a straight line between the pivot of the hinge 61 and the connection 64. This arrangement yieldably maintains each of the doors either in closed upwardly extending concealing position or in downwardly extending depending open position, as desired.

The body is additionally provided with a storage compartment 70 at its forward end adjacent the cab 14 of the truck for containing individual pallets or empty bottle cases for the convenience of the operator of the truck. The storage compartment is provided with a pair of inner plates 71 extending vertically adjacent and downwardly from the outer longitudinal faces of the widened portion 16 of the frame of the truck. The compartment is also provided with a sheet metal forward wall 72 which also forms the forward end of the truck body and is located transversely of the body in spaced parallel relationship forwardly of the forward wall 44 of the forward compartments 38. A sheet metal floor 73 extends horizontally across the lower portion of the storage compartment 70 for supporting articles therein. A door, not shown, may be pivotally mounted in closing relation to the outer sides of the storage compartments 70.

The rear end of the truck body is provided with a rear finishing plate 78 which covers the entire rear end of the truck body and is rolled forwardly and secured, as by welding, to the outer edges of the wall 45 of the rear compartments 42.

Operation

The operation and utility of the present invention is believed to be apparent from the foregoing description but is briefly summarized at this point. In the loading and unloading of bottled beverages, for example, the bottle cases 54 are stacked on the pallets 57. The supporting area of the pallets 57 are conveniently such that each supports eight stacks of bottle cases, as shown in Figs. 1 and 4, and each pallet is of a width to slide into the compartments conveniently without binding. Each forward compartment 38 and each rearward compartment 42 conveniently has a height that will contain a stack of bottle cases containing bottles seven tiers high, as shown in Fig. 1. Each of the central compartments 40 is not as deep as the adjacent forward and rearward compartments and conveniently will contain a stack of bottle cases containing bottles five tiers high, as illustrated in Fig. 4.

When it is desired to load a compartment with stacked bottle cases, its respective door 60 is pivoted from its normal, upwardly extending or concealing position to a downwardly depending open position so that the forks of a fork truck may enter into the channel portion 52 of the compartment. A fork truck is directed to insert the forks of the truck under the pallet supporting stacked bottle cases and is operated to hoist the stacked cases and to move the cases to a position immediately outwardly of the compartment to receive the bottle cases. The fork truck is moved to extend the forks thereof into the channel portions 56 of the compartment until the cases are in contact with the rear panel 32 of the compartment. The forks of the fork truck are thereafter lowered, first bringing the outer edge of the pallet in contact with an outer portion of the floor 50 of the compartment, and further downward movement of the forks permits the pallet and stacked bottle cases to tilt inwardly until in firm supported relation on the floor of the compartment inclined against the panel 32. The forks of the fork truck are thereafter removed from the recesses 56 of the compartment and the respective door 60 of the compartment pivoted upwardly to a position concealing the face plate 53 and channel portions 56 of the compartment and the outer edge of the pallet therein. The pallet supported stacked bottle cases may be as conveniently removed from the truck body by reversing the series of steps previously enumerated.

From the foregoing description it will be seen that a truck body is provided by the use of which stacked bottle cases or like stacked articles may be quickly, easily, and conveniently loaded thereon or removed therefrom by the use of a power operated fork truck for handling the stacked cases. By providing the forward compartment 38 and the rearward compartment 42 extending appreciably downwardly below the truck frame on which it is supported, the body has greater carrying capacity than truck bodies heretofore provided. By constructing the forward and rearward compartments downwardly below the truck frame, the center of gravity is lowered relative to conventional truck bodies bearing similar loads. The truck body is relatively inexpensive as to the materials required and is economically welded into a one-piece construction. The body is of rugged construction and of comparatively light weight, being formed almost entirely of sheet metal reinforced by few structural members welded to each other and to the sheet metal members of the truck body.

The inclining of the pallets 57 and the cases of other articles borne thereby and the leaning of the loads inwardly against the longitudinal center wall of the body formed by the panels 32 dependably maintains the pallets and load on the truck during transportation without any auxiliary load securing means. Jostling and vibration during transportation tends securely to maintain the loads on the truck because of the inwardly sloped floors 50. The right-angular relationship of the panels 32 to the floors 50 maintains the cases of bottled beverages 54 or other articles in original stacked relation on the pallets so that the pallets and their loads may be conveniently removed by a power operated fork lift truck by inserting the forks into the channel portions 52, raising the forks to return the pallets to horizontal positions and the stacked articles to erect stacked positions thereon, further elevating the forks to clear the pallets from the floors 50, backing the power operated fork lift truck so as to remove the forks from the channel portions 52, and thence conveying the removed pallet and stacked material to any desired depositing position.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent constructions.

Having described my invention, what I claim as new and desire to secure by Letters Patent is:

1. A load supporting body for a vehicle comprising an upwardly extended wall mounted longitudinally of the vehicle, said wall having laterally disposed upwardly convergent sides; and floors mounted on the vehicle on opposite sides of the wall and at each side of the wall being substantially normal to their respectively adjacent side of said wall and upwardly and outwardly extended therefrom, said floors being formed with elongated, transversely substantially U-shaped channels laterally extended from the wall across their respective floors having substantially flat horizontal bottoms substantially flush with their respective floors adjacent to the wall and outwardly from the wall diverging from their floors.

2. In an earth-traversing vehicle having support wheels, the combination of an elongated frame supported for longitudinal movement on the wheels, said frame having portions of greater width adjacent to the wheels and portions of lesser width endwardly adjacent to said portions of greater width; a pair of panels mounted longitudinally of the frame, spaced adjacent to the frame a distance substantially equal to the narrow portions of the frame and upwardly extended in convergent relation, said panels having lower edges terminating substantially at the height of the frame at its portions of greater width and edges below the frame at its portions of reduced width; and floors secured to the lower edges of the panels and laterally extended therefrom in substantially right-angular relation to their respective panels, said floors each having pairs of spaced laterally disposed channel portions formed integrally therein including bottoms substantially flush with the floors adjacent to the panels and horizontally extended therefrom.

3. In a vehicle supported for earth-traversing movement on wheels, the combination of an elongated frame supported on the wheels for longitudinal movement, said frame having substantially parallel sides and having a portion of increased width adjacent to the wheels for lateral stability; an inverted V-shaped wall mounted longitudinally on the frame, having lower edges terminating substantially at the frame height at the portions thereof of increased width and being fitted downwardly over the frame at the other portions with lower edges appreciably below the frame; floors laterally extended from the lower edges of the wall substantially normal thereto; and pairs of laterally disposed channel portions formed in the floors having substantially horizontal bottoms for the reception of the tines of fork trucks employed to load and unload material on the floors.

4. In a vehicle having an elongated frame with longitudinally adjacent portions including parallel sides of different widths, the combination of partitions mounted transversely on the frame intermediate the adjacent portions of different widths, an inverted V-shaped wall mounted longitudinally of the frame fitted downwardly over the portions of the frame of reduced width and rested upon the portions of the frame of greater width, the V-shaped wall having substantially horizontal edges adjacent to the top of the frame in the portions of increased width and edges appreciably below the frame where fitted downwardly over the portions of lesser width, and floors laterally extended from the lower edges of the wall substantially normal to the adjacent sides of the wall, said floors having laterally positioned channel portions formed therein having substantially horizontal bottoms for the reception of independent load positioning and removing means therein.

5. A support body mounted on an elongated frame supported for earth-traversing movement comprising at least one compartment at each side of the longitudinal center of the truck frame each defined by a longitudinally positioned, upwardly extended, inwardly inclined back panel, parallel side panels extended laterally from each back panel and spaced longitudinally of the frame, a longitudinally horizontal floor member interconnecting the compartment side panels laterally upwardly inclined normal to the back panel, the floor member of each compartment being recessed downwardly transversely of the frame for reception of the forks of a fork truck, and removable means for concealing the outer transversely normally exposed recessed portions of the floor members.

6. In an earth-traversing vehicle having support wheels, the combination of a frame mounted on the vehicle having an elongated member adjacent to a wheel of the vehicle substantially aligned with the normal direction of movement of the vehicle and a second elongated member endwardly adjacent to the first mentioned member in substantially parallel relation thereto and positioned laterally inwardly of said first member relative to the vehicle, a panel supported on the elongated members having lower edges terminating substantially at the height of the frame at the first member and appreciably below the frame at the second member, the panel being upwardly and inwardly extended from its lower edges, and floors secured to the lower edges of the panel and laterally extended therefrom in substantially right-angular relation to the panel.

FRED GERHARDT.

REFERENCES CITED

The following references are of record in the file of this patent:

UNITED STATES PATENTS

| Number | Name | Date |
|---|---|---|
| 1,241,481 | Walker | Sept. 25, 1917 |
| 1,271,413 | Allen | July 2, 1918 |
| 2,061,673 | Robinson | Nov. 24, 1936 |
| 2,100,971 | McDonald | Nov. 30, 1937 |
| 2,451,226 | Kemp, Jr. | Oct. 12, 1948 |
| 2,468,513 | Rider | Apr. 26, 1949 |

OTHER REFERENCES

"A Unit Load Transfer System for Air Cargo" by C. W. Gordon, "Flying" magazine, May 1944, page AC-10.